United States Patent
Saghiri

(10) Patent No.: US 12,283,072 B2
(45) Date of Patent: *Apr. 22, 2025

(54) ZERO-VISION CAMERA SYSTEM

(71) Applicant: SiliconeSignal Technologies, Meknes (MA)

(72) Inventor: Khalid Saghiri, Meknes (MA)

(73) Assignee: SiliconeSignal Technologies, Meknes (MA)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,683

(22) Filed: Mar. 14, 2024

(65) Prior Publication Data

US 2025/0095210 A1    Mar. 20, 2025

Related U.S. Application Data

(63) Continuation of application No. 18/468,706, filed on Sep. 16, 2023, now Pat. No. 11,961,263.

(51) Int. Cl.
*G06T 9/00* (2006.01)
*G06T 5/10* (2006.01)
(Continued)

(52) U.S. Cl.
CPC ............ *G06T 9/00* (2013.01); *G06T 5/10* (2013.01); *G06T 5/20* (2013.01); *G06T 5/50* (2013.01);
(Continued)

(58) Field of Classification Search
CPC .... G06T 9/00; G06T 5/10; G06T 5/20; G06T 5/50; G06T 5/70; G06T 2207/20052;
(Continued)

(56) References Cited

U.S. PATENT DOCUMENTS

| 6,510,520 B1 | 1/2003 | Steinberg |
| 7,663,670 B1 | 2/2010 | Orboubadian |

(Continued)

FOREIGN PATENT DOCUMENTS

| CN | 108599946 A | 9/2018 |
| CN | 109788168 B | 1/2021 |

(Continued)

OTHER PUBLICATIONS

U.S. Appl. No. 18/468,706, Non Final Office Action mailed Oct. 30, 2023, 14 pgs.

(Continued)

*Primary Examiner* — Jose L Couso
(74) *Attorney, Agent, or Firm* — Polygon IP, LLP

(57) ABSTRACT

A hardware camera may include a camera sensor configured to determine input image data. The hardware camera may also include an image signal processor configured to perform one or more image signal processing operations on the input image data. The hardware camera may also include a neural processing unit configured to determine encoded image data by encoding the input image data with an image data encoder portion of a camera autoencoder. The camera autoencoder may be trained based on training image data collected from the camera sensor and a fingerprint specific to the hardware camera. The hardware camera may also include a camera communication interface configured to transmit the encoded image data to a remote computing system, which may determine decoded image data by decoding the encoded image data via an image data decoder portion of the camera autoencoder.

20 Claims, 7 Drawing Sheets

(51) Int. Cl.
*G06T 5/20* (2006.01)
*G06T 5/50* (2006.01)
*G06T 5/70* (2024.01)

(52) U.S. Cl.
CPC ...... *G06T 5/70* (2024.01); *G06T 2207/20052* (2013.01); *G06T 2207/20084* (2013.01); *G06T 2207/20224* (2013.01)

(58) Field of Classification Search
CPC . G06T 2207/20084; G06T 2207/20224; G06T 3/4046; G06T 5/60; G06T 9/002; G06T 2207/20076; G06T 2207/20081; G06V 10/10; G06V 40/12; G06V 40/1306; G06V 40/1365; G06V 40/50; G06V 40/60; G06V 40/70; G06V 10/454; G06V 10/54; G06V 10/774; G06V 10/82; G06V 20/41; G06V 30/18057; G06V 30/19173; G06F 21/32; G06F 21/602; G06F 18/214; G06F 18/22; G06F 18/241; G06F 18/2415; H04L 9/00; H04L 9/008; H04L 63/0428; H04L 63/0861; H04L 63/0869; H04L 9/0618; H04L 9/0819; H04L 9/0825; H04L 9/0866; H04L 9/0894; H04L 9/3231; H04N 2201/3226; H04N 2201/3233; H04N 2201/3236; H04N 2201/3239; H04N 2201/3281; H04N 1/32272; H04N 1/4406; H04N 1/442; H04N 1/444; H04N 1/2347; H04N 1/4405; H04N 1/4408; H04N 2201/3205; H04N 2201/3277; G06Q 20/40145; G07C 9/37; G06N 3/02; G06N 3/08–088; G06N 3/0445; G06N 3/0454; G06N 3/4046; G06N 7/00; G06N 7/01; G06N 20/00; G06K 7/1482; Y10S 128/925
See application file for complete search history.

(56) References Cited

U.S. PATENT DOCUMENTS

| | | |
|---|---|---|
| 11,121,869 B1 | 9/2021 | Crahen et al. |
| 2006/0013434 A1 | 1/2006 | Smith et al. |
| 2006/0268357 A1 | 11/2006 | Vook et al. |
| 2009/0034852 A1 | 2/2009 | Brock |
| 2020/0272748 A1 | 8/2020 | Davidson et al. |
| 2020/0320745 A1 | 10/2020 | Clausen et al. |
| 2021/0144274 A1 | 5/2021 | Sanguinetti et al. |
| 2021/0279475 A1* | 9/2021 | Tusch ................ H04L 63/0861 |
| 2021/0287322 A1 | 9/2021 | Yaffe et al. |
| 2022/0083676 A1* | 3/2022 | San Pedro ............ G06V 20/52 |
| 2022/0358754 A1* | 11/2022 | Taylor ................... G06V 10/98 |
| 2023/0276146 A1 | 8/2023 | Markhasin et al. |

FOREIGN PATENT DOCUMENTS

| | | |
|---|---|---|
| CN | 110235436 B | 3/2022 |
| CN | 115412691 A | 11/2022 |
| JP | H09509795 A1 | 9/1997 |
| JP | 2002504272 A | 2/2002 |
| JP | 2020145533 B | 7/2023 |
| WO | 2018135142 A1 | 7/2018 |

OTHER PUBLICATIONS

U.S. Appl. No. 18/468,706, Notice of Allowance mailed Jan. 30, 2024, 7 pgs.

Berdich, Adriana et al., "Smartphone Camera Identification from Low-Mid Frequency DCT Coefficients of Dark Images", Entropy Aug. 2022, 24, 1158. https://doi.org/10.3390/e24081158.

Kim, Younghyun et al., "CAMPUF: Physically Unclonable Function based on CMOS Image Sensor Fixed Pattern Noise", DAC '18, Jun. 24-29, 2018, San Francisco, CA, USA, 2018 Association for Computing Machinery.

Klosowski, Miron et al., "Fixed Pattern Noise Reduction and Linearity Improvement in Time-Mode CMOS Image Sensors", Sensors, Oct. 20, 2020; 20, 5921; doi:10.3390/s20205921.

* cited by examiner

ZERO-VISION CAMERA SYSTEM

CROSS-REFERENCE TO RELATED APPLICATIONS

This patent application is a continuation of and claims priority under 35 U.S.C. 120 to U.S. patent application Ser. No. 18/468,706 filed Sep. 16, 2023 by Khalid Saghiri, titled "Zero-Vision Camera System", which is hereby incorporated by reference in its entirety and for all purposes.

FIELD OF TECHNOLOGY

This patent application relates generally to cameras, and more specifically to the encryption and decryption of image data generated by cameras.

BACKGROUND

Cameras are used in many sensitive contexts. For example, in a security context, a camera may capture images of a sensitive location, personally identifying information, private activities, or other such details that may implicate security or privacy concerns. However, conventional techniques for securing camera data include significant vulnerabilities. For example, if camera image data is encrypted with a key, then anyone possessing the key would be able to decrypt the image data. Further, such a key would need to be shared between a location at which the image data is encrypted and the location at which it is decrypted, and such key sharing gives rise to the possibility of key interception. Finally, the camera image data needs to be decrypted in order to be analyzed, potentially allowing anyone with access to the recipient system to view any sensitive information reflected in the camera image data. Accordingly, improved techniques for camera data encryption are desired.

SUMMARY

Techniques and mechanisms described herein provide for devices, systems, methods, and non-transitory computer readable media for camera image data encoding and decoding. According to various embodiments, a camera autoencoder trained based on training image data collected from a hardware camera and a fingerprint specific to the hardware camera may be determined. The camera autoencoder may include an image data encoder stored on a storage device at the hardware camera and an image data decoder stored on a remote computing device. Input image data from a camera sensor included in the hardware camera may be determined. Encoded image data may be determined by encoding the input image data at the hardware camera with the image data encoder. The encoded image data may be transmitted to the remote computing device, which may determine decoded image data by decoding the encoded image data via the image data decoder.

In some embodiments, the fingerprint may be a fixed pattern noise (FPN) dark signal non-uniformity (DSNU) pattern. Determining the FPN DSNU pattern may involve one or more operations such as capturing one or more dark frame images with the camera sensor while the camera sensor is covered, determining a pixel-wise average frame based on the one or more dark image frames, determining a denoised average frame based on the pixel-wise average frame, determining an updated frame by subtracting the denoised average frame from the pixel-wise average frame, and applying a discrete cosine transform high-pass filter to the updated frame.

In some embodiments, determining the camera autoencoder may involve training the camera autoencoder based on the training image data, storing the image data encoder on the storage device, and transmitting the image data decoder to the remote computing device.

In some embodiments, the image data encoder may include a plurality of encoder internal neuron layers and encodes the input image data into a latent space neuron output layer. The image data decoder may include a plurality of decoder neuron layers and decodes input image data from a latent space neuron input layer into a decoder output neuron layer.

In some embodiments, the remote computing device may include a deep learning analytics image decoder neural network that includes the image data decoder and one or more analytics neuron layers configured to perform one or more analytics tasks. The deep learning analytics image decoder neural network may include a plurality of obfuscation layers collectively configured to implement a transformation and an inverse of the transformation.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for camera image data encoding and decoding. These drawings in no way limit any changes in form and detail that may be made by one skilled in the art without departing from the spirit and scope of the disclosed implementations.

DETAILED DESCRIPTION

Introduction

Figure 1:
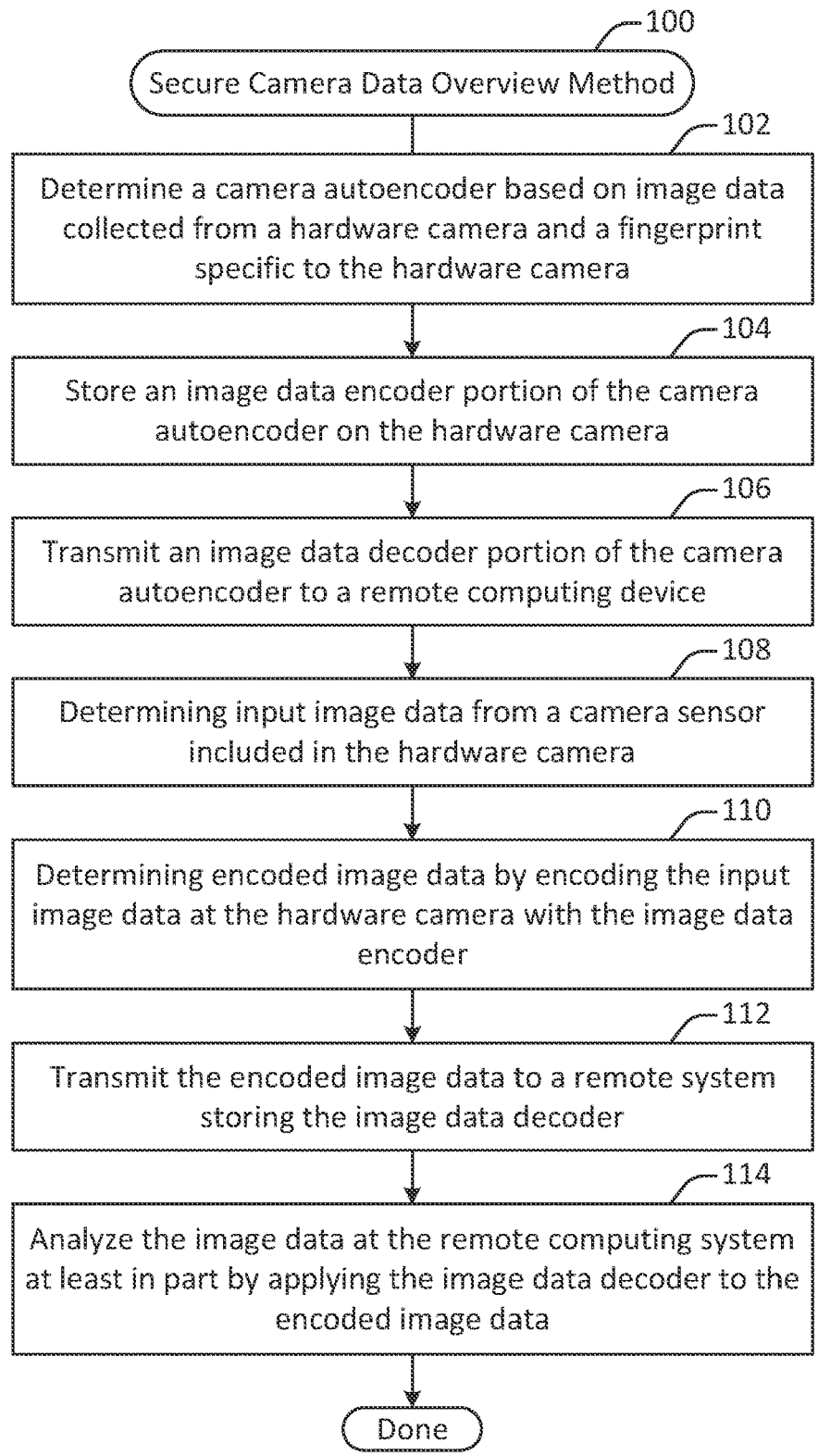
FIG. 1 illustrates an overview method for secure camera data processing, performed in accordance with one or more embodiments.

Techniques and mechanisms described herein provide for the encoding and decoding of image data determined based on a sensor at a camera. A fingerprint of a sensor may be used to train a camera autoencoder. The camera autoencoder may then be divided into an image data encoder that is stored at the camera and an image data decoder that is transmitted to a remote computing system. Image data such as one or more still images and/or video streams may be determined based on one or more sensors at the camera. The image data may then be encoded into a latent space by the image data encoder. The encoded image data may be transmitted to the remote computing system, where it may be decoded by the image data decoder and analyzed.

Cameras are frequently deployed in situations where they capture images of private, personal, and/or secure information or activities. In many situations, image and/or video data is transmitted to remote computing systems for monitoring, for instance for security purposes. Such configurations create many security risks. For instance, the image and/or video data may be intercepted and accessed at the camera, after transmission by the camera, or at the remote computing system.

Some conventional approaches for securing the image and/or video data involve encryption via a shared private key. However, such techniques require the private key to be exchanged, which entails a risk that the private key is intercepted. Moreover, such a configuration provides no guarantee that private key is unique to a particular camera, potentially allowing the decryption of the image and/or video data. Additionally, such a configuration requires encrypting the image and/or video data after it is output at the camera system-on-a-chip (SoC) and then decrypting the image and/or video data at the remote computing system, creating a risk that the unencrypted image and/or video data may be accessed at either the source or destination, for instance via direct memory access. Next, conventional approaches for securing image and/or video data typically require additional operations to be performed for compressing the image and/or video data for transmission.

In contrast to these conventional approaches, techniques and mechanisms described herein provide for secure transmission of image and/or video data. In some embodiments, image and/or video data may be encoded such that the encoded data replaces the presence of an unencoded visual stream at the camera SoC level. In some embodiments, image and/or video data may be encoded in a manner that is specific to the unique characteristics of the physical camera, for instance by employing a fixed pattern noise (FPN) dark signal non-uniformity (DSNU) pattern as a fingerprint.

In some embodiments, bit stream decoding may take place on premises, on the edge, or on the cloud via a decoder that is specific to the physical camera. Using a decoder from a camera other than that responsible for sending the encoded image and/or video data would result in the image and/or video data not being decoded.

In some embodiments, bit stream encoding may take place inside an image signal processing deep learning network implemented at the camera configured to carry out image signal processing tasks. The image data encoder may be entangled in the image signal processing deep learning network. In such a configuration, the hardware camera may never produce a visualizable video stream.

In some embodiments, bit stream decoding may take place inside an image data analytics deep learning network configured to carry out video analytics tasks by entangling the image data decoder in that deep learning network. In a configuration where the deep learning data outputs only analytics data and no visualizable video stream, the image and/or video data may be analyzed without ever being present at the remote computing system in a visualizable state. That is, in such a system configuration the system will never output a visualizable video stream.

In some implementations, the use of a camera autoencoder may allow for simultaneous compression and encoding. Such an approach may provide for reduced computation costs, improved security, and/or one or more other advantages.

FIG. 1 illustrates an overview method 100 for secure camera data processing, performed in accordance with one or more embodiments. The method 200 may be performed at any suitable device or combination of devices. For instance, the method 200 may be performed at the image data processing system 200 shown in FIG. 2.

Figure 3:
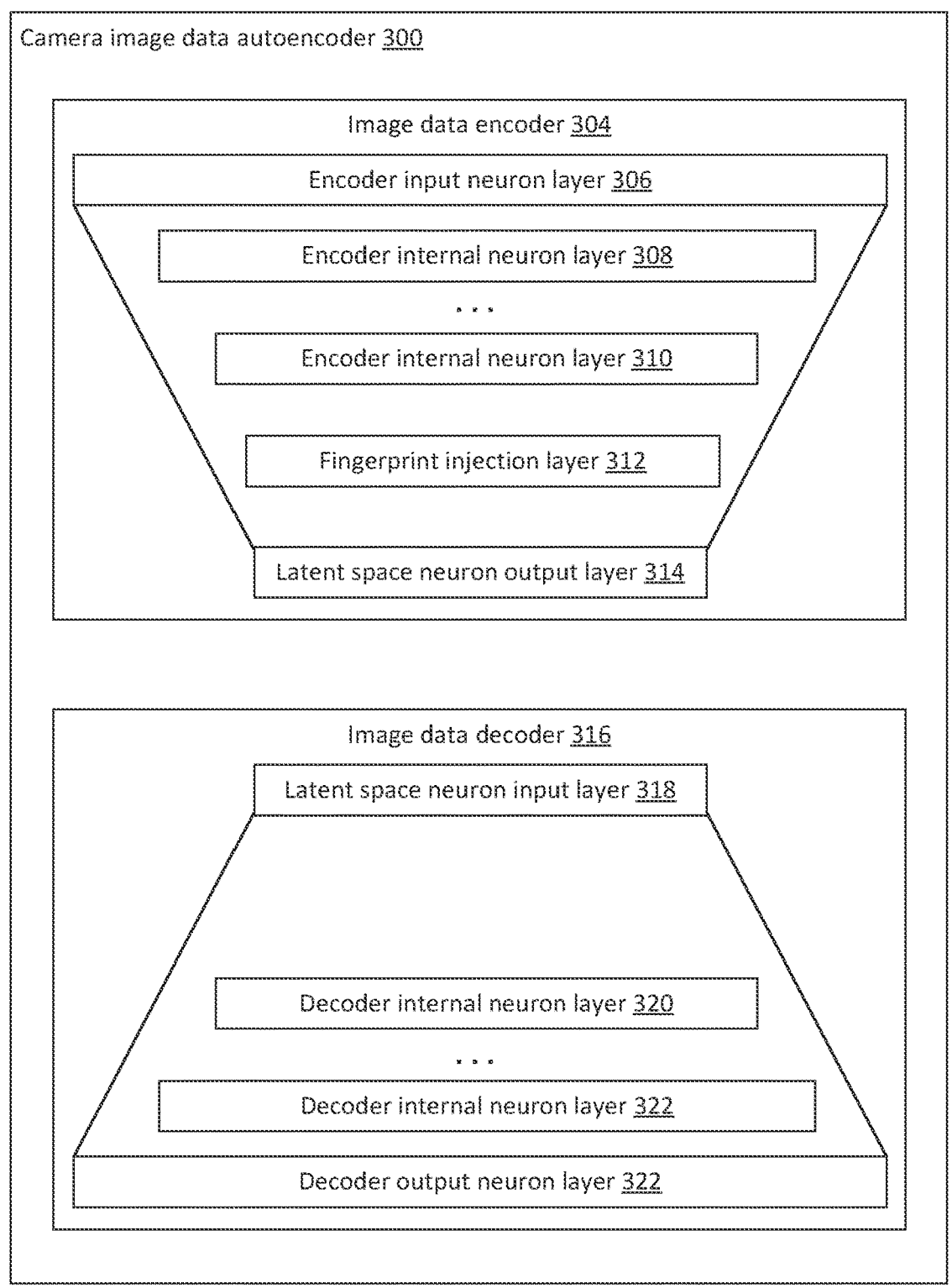
FIG. 3 illustrates a camera autoencoder, configured in accordance with one or more embodiments.

A camera autoencoder is determined at 102 based on image data collected from a hardware camera and a fingerprint specific to the hardware camera. In some embodiments, determining the camera autoencoder may involve operations such as determining a camera-specific fingerprint, collecting training data at the hardware camera, and training the autoencoder. An example of a camera autoencoder is shown in FIG. 3. An example of a method for training a camera autoencoder is shown in the method 400 in FIG. 4.

An image data encoder portion of the camera autoencoder is stored on the hardware camera at 104. In some embodiments, the camera autoencoder may be divided into an image data encoder portion and an image data decoder portion, as shown in FIG. 3. Then, the image data encoder portion may be stored in a location accessible to a neural processing unit. The neural processing unit may then use the image data encoder portion to encode image data collected from a camera sensor into a latent space.

An image data decoder portion of the camera autoencoder is transmitted to a remote computing system at 106. In some embodiments, the remote computing system may be, for instance, a security system configured to monitor images and/or video data transmitted by the hardware camera. Alternatively, or additionally, the remote computing system may be any system configured to receive images and/or video data transmitted by the hardware camera, for instance for the purpose of performing analytics.

Input image data from a camera sensor included in the hardware camera is determined at 108. The input image data may be, for instance, one or more still images, video frames, bitstreams, or other such data captured at the camera in the course of its normal operation.

Figure 2:
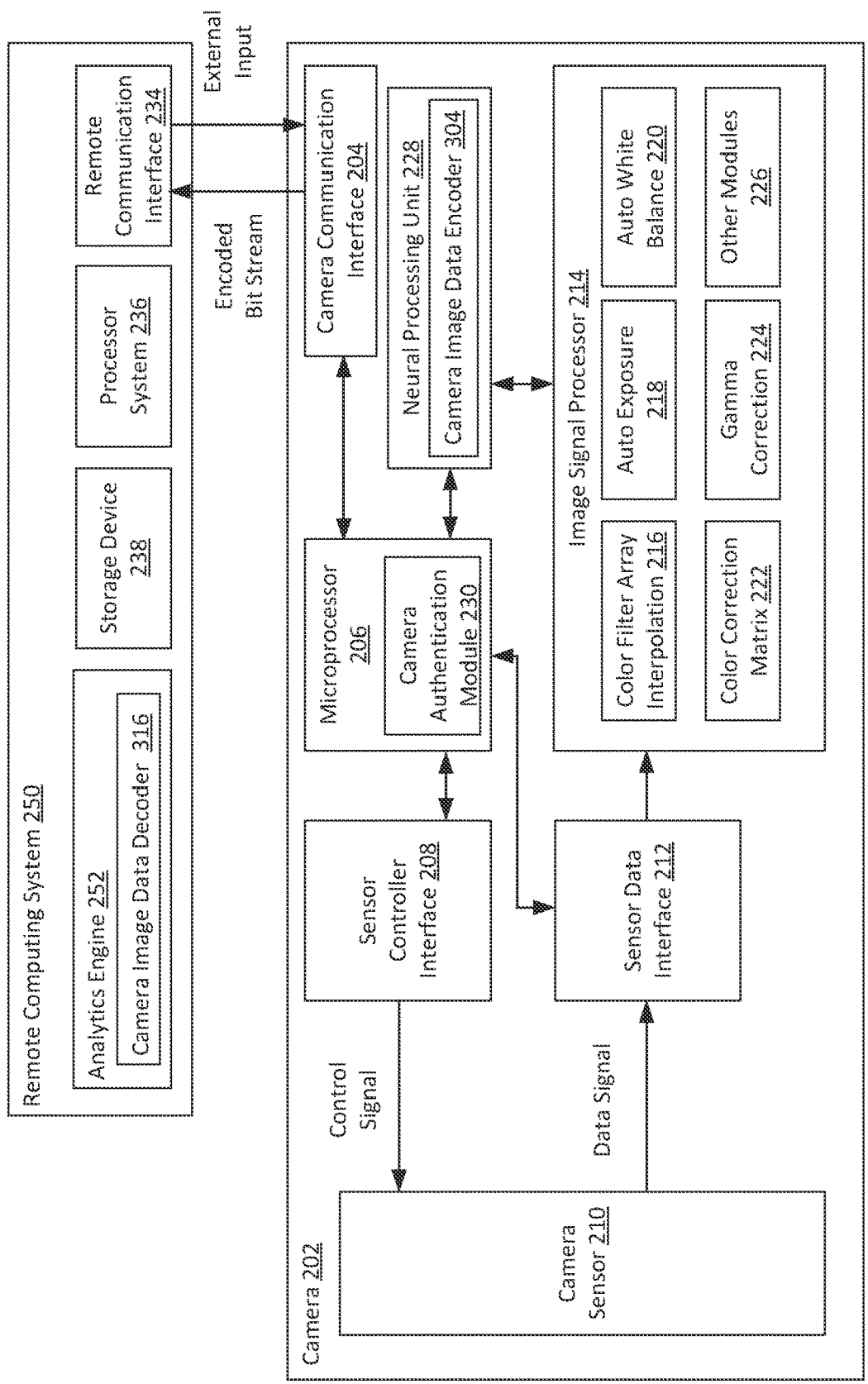
FIG. 2 illustrates an image data processing system, configured in accordance with one or more embodiments.

Encoded image data is determined at 110 by encoding the input image data with the image data encoder at the hardware camera. Encoding the input image data may involve applying the image data encoder portion of the camera autoencoder to some or all of the input image data. In some configurations, the image data may be processed prior to encoding the input image data with the encoder portion. For instance, as shown in FIG. 2, the image data may be processed with a color correction matrix module, an auto exposure module, and/or one or more other modules.

In some implementations, one or more operations normally performed by an ISP module may instead be implemented in a deep learning-based ISP module implemented in the neural processing unit. The camera data encoder may be entangled with the deep-learning ISP module. In such a configuration, the hardware camera does not ever produce a visualizable video stream, and the camera data encoder functionality is not readily separable from other operations performed by the hardware camera.

The encoded image data is transmitted to a remote system storing the image data decoder at 112. The encoded image data may be transmitted by a communication interface to the remote system via the internet. Alternatively, or additionally, the encoded image data may be transmitted in some other way, for instance via a universal serial bus (USB) connection, ethernet connection, or other connection to a remote computing device communicably coupled with the camera via a local network, peripheral connection, or other mechanism.

At 114, the image data is analyzed at the remote computing system at least in part by applying the image data decoder to the encoded image data. In some embodiments, the encoded image data may be decoded prior to analysis. Alternatively, the image data decoder may be entangled in a neural network such as a deep learning module, which may then be used to analyze the image data without the decoded image data being present in an observable state anywhere on the remote computing system. Additional details regarding image data decoding and analysis are discussed with respect to FIG. 6 and FIG. 7.

System Architecture

FIG. 2 illustrates an image data processing system 200, configured in accordance with one or more embodiments. The image data processing system 200 includes a camera 202 in communication with a remote computing system 250 via a network. The camera 202 includes a camera communication interface 204, a microprocessor 206, a sensor controller interface 208, a camera sensor 210, a sensor data interface 212, an image signal processor 214, and a neural processing unit 228. The image signal processor 214 includes a color filter array interpolation module 216, an auto exposure module 218, an auto white balance module 220, a color correction matrix 222, a gamma correction module 224, and one or more other modules 226. The neural processing unit 228 includes a camera image data encoder 304. Embodiments of the camera 202 need not include every element shown in FIG. 2. The remote computing system 250 includes a storage device 238, a processor system 236, a remote communication interface 234, and an analytics engine 252 which includes a camera image data decoder 316. As discussed herein, in some embodiments some or all of the functionality of the image signal processor 214 may instead be implemented in a deep learning network executed by the neural processing unit 228. The camera data encoder may be entangled in such a deep learning network.

According to various embodiments, the camera 202 may include one or more sensors, including the camera sensor 210. The camera sensor 210 may be a charge-coupled device (CCD) sensor, a complementary metal-oxide semiconductor (CMOS) sensor, or any other suitable sensor.

In some embodiments, the camera sensor 210 may receive control signals from the sensor controller interface 208. For instance, the sensor controller interface 208 may be an inter-integrated circuit (I2C) interface configured to facilitate communications between the microprocessor 206 and the camera sensor 210.

In some implementations, data signals output by the camera sensor 210 may be sent to the sensor data interface 212. The sensor data interface 212 may be a mobile industry processor interface camera serial (MIPI-CSI) interface, a reduced voltage low-voltage differential signaling (sub-LVDS) interface, or any other suitable mechanism for receiving the data signal.

According to various embodiments, the image signal processor 214 may include one or more of a variety of modules configured to perform pre-processing on the data signal before it is sent to the neural processing unit 228. Different cameras may include different combinations of modules and be configured to perform different functions within the image signal processor 214. In particular embodiments, the image signal processor 214 may be implemented as one or more neural networks, such as a deep learning network, configured to perform some or all of the functions of the various tasks associated with the image signal processor.

In some embodiments, the neural processing unit 228 may be configured to receive a data signal output by the image signal processor 214 and encode the data signal via the image data encoder 304. The image data encoder 304 may be configured as discussed with respect to the camera autoencoder 300 shown in FIG. 3. As discussed herein, the neural processing unit 228 may be configured to implement a deep learning network that performs one or more functions traditionally performed by the image signal processor and in addition includes a camera data encoder portion entangled in the deep learning network. Additional details regarding the training and application of the camera autoencoder 300 are discussed with respect to FIG. 4, FIG. 5, and FIG. 6.

According to various embodiments, the encoded data signal may be provided to the microprocessor 206, which may provide the encoded data signal to the communication interface 204 for transmission to the remote communication interface 234.

In particular embodiments, the microprocessor 206 may include a camera authentication module 230. The 230 may be used to authenticate the camera 202 via the same fingerprint used to train the camera autoencoder 300. For instance, the camera authentication module 230 may be configured to use a challenge-response protocol to perform such authentication. In such a procedure, the camera authentication module 230 may be configured to include a function that provides a device-specific response based on the fingerprint. The function may be a physical unclonable function (PUF) which draws its uniqueness from, for instance, unpredictable circuit variations that result from the manufacturing process.

According to various embodiments, the storage device 238 may include one or more devices or interfaces for storing information in a manner accessible to the remote computing system 250. The processor system 236 may include one or more virtual and/or physical processors configured to implement functions associated with the analytics engine 252.

In some embodiments, the analytics engine 252 may perform application-specific operations such as monitoring still images and/or a video stream for an application such as security assessment. Such a video stream may be received as encoded image data sent by the camera 202.

In some embodiments, the image data decoder 316 may be implemented as a stand-alone process used to decode the encoded image data prior to analysis by other elements of the analytics engine 252. Alternatively, the image data decoder 316 may be entangled with other elements of the 252, such as a deep learning model used to detect security risks. Depending on the application, such a configuration may help to avoid the presence of decoded image data anywhere in the system 200 after the image data is initially encoded by the neural processing unit 228.

In some embodiments, the camera 202 may also be configured to send image data from the sensor data interface 212 to the microprocessor 206 without processing by the image signal processor 214. For instance, when collecting dark image frames from the camera sensor while the sensor is covered, the dark images may not be processed by the image signal processor 214 prior to use in training the camera autoencoder 300.

FIG. 3 illustrates a camera autoencoder 300, configured in accordance with one or more embodiments. The camera autoencoder 300 is a neural network trained to encode input image data into a latent space, and then decode the latent space into output image data. The camera autoencoder 300 may be determined as discussed with respect to the method 400 shown in FIG. 4. Broadly speaking, the camera autoencoder 300 may be trained by configuring the weights of the camera autoencoder 300 such as the output image data closely matches the input image data.

In some embodiments, the camera autoencoder 300 may be a variational autoencoder or a more traditional autoencoder. The encoder portion of an autoencoder outputs latent vectors. The encoder portion of a variational autoencoder instead outputs parameters of a pre-defined distribution in the latent space for every input. The variational autoencoder then imposes a constraint on this latent distribution, for instance forcing it to be a normal distribution, ensuring that the latent space is regularized.

According to various embodiments, the camera autoencoder 300 includes an image data encoder 304 and an image data decoder 316. The image data encoder 304 includes an encoder input neuron layer 306, one or more encoder internal neuron layers 308 through 310, a fingerprint injection layer 312, and a latent space neuron output layer 314. The image data decoder 316 includes a latent space neuron input layer 318, one or more decoder internal neuron layers 320 through 322, and a decoder output neuron layer 322.

According to various embodiments, the image data encoder includes a number of neurons. These neurons may be arranged in layers. Except for the input layer, the neurons in a particular layer may be connected to the neurons in the immediately preceding layer. Further, except for the output layer, the neurons in a particular layer may also be connected to the neurons in the immediately succeeding layer.

In some embodiments, the encoder input neuron layer 306 may include one or more neurons configured to receive image data as input. For instance, the encoder input neuron layer 306 may include a number of neurons, each of which may correspond with a pixel in an image or image portion. The neurons in the encoder input neuron layer 306 then connect with neurons in the internal neuron layers, which in turn connect with the neurons in the latent space neuron output layer 314.

In particular embodiments, the encoder input neuron layer 306 may be configured to accept a tensor. For instance, the encoder input neuron layer 306 may include a designated number of neurons (e.g., three neurons) for each pixel in the input image data. As one example, a monitor pixel may include three different color channels (e.g., red, green, and blue). The values for these three-color channels may be represented as three different input values to different neurons in the encoder input neuron layer 306. Hence, a 1024×768 pixel image may be input as a 1024×768×3 tensor. The decoder output neuron layer 322, discussed in further detail below, may have a shape that matches the encoder input neuron layer 306.

According to various embodiments, the latent space neuron output layer 314 includes a number of neurons encoding the input image data into a latent space. In some configurations, the neurons in the latent space neuron output layer 314 may include both a vector of means and another vector of standard deviations. In this way, the latent space neuron output layer 314 may readily support random sampling and interpolation.

In some embodiments, the encoder internal neuron layers 308 through 310 may each include a respective number of neurons. Various embodiments of a camera autoencoder 300 may be configured differently, for instance including different numbers of internal neuron layers and different numbers of neurons in the layers. Further, different encoder neuron layers in an image data encoder 304 may include different numbers of neurons. In general, the encoder input neuron layer 306 includes a relatively large number of neurons to facilitate the encoding of a relatively large amount of input data. Then, successive encoder internal neuron layers include decreasing numbers of neurons until the latent space neuron output layer 314, which typically includes the fewest number of neurons in any layer.

In some implementations, the fingerprint injection layer 312 may be in many ways similar to encoder internal neuron layers. However, the neurons in the fingerprint injection layer 312 may have weights with values fixed based on a fingerprint specific to the hardware camera linked with the camera autoencoder 300. In this way, the camera autoencoder may be made suitable for encoding and decoding images for a particular camera rather than for any camera.

According to various embodiments, the fingerprint injection layer 312 may be positioned at any suitable location within the image data encoder 304. For instance, the fingerprint injection layer 312 may be positioned before the one or more encoder internal neuron layers 308 through 310, after the one or more encoder internal neuron layers 308 through 310, or between different encoder internal neuron layers. In particular embodiments, the fingerprint injection layer 312 may be positioned close to the latent space neuron output layer 314. For instance, the fingerprint injection layer 312 may be positioned as the last layer or the penultimate layer before the latent space neuron output layer 314.

According to various embodiments, the image data decoder 316 may be in many ways the reverse of the image data encoder. For instance, the image data decoder 316 may include a latent space neuron input layer 318 that receives as input the output of the latent space neuron output layer 314. The latent space neuron input layer 318 may then connect to the one or more decoder internal neuron layers 320 through 322, which finally may connect to the decoder output neuron layer 322.

According to various embodiments, the decoder output neuron layer 322 may include a number of neurons corresponding to the output image data. For instance, the decoder output neuron layer 322 may include the same number of neurons as the encoder input neuron layer 306.

According to various embodiments, configuration parameters such as the number of internal neuron layers, the size of the latent space, the positioning of the fingerprint injection layer 312, and/or the number of neurons in each layer may be determined based on manual specifical, for instance based on conditions associated with a particular application, and/or combinations thereof. For example, increasing the number of internal neuron layers and/or the number of neurons per layer in the encoder and/or decoder may increase the accuracy of the camera autoencoder 300 at the cost of additional storage space and computational complexity. As another example, increasing the number of neurons in the latent space neuron output layer 314 and the latent space neuron input layer 318 may increase the accuracy of the camera autoencoder 300 at the cost of reduced image compression during transmit and hence increased bandwidth requirements.

According to various embodiments, configuration parameters such as the number of internal neuron layers, the size of the latent space, the positioning of the fingerprint injection layer 312, and/or the number of neurons in each layer may be determined based on hyperparameter tuning. For instance, various combinations of such parameters may be tried to determine a configuration that provides high accuracy while nevertheless comporting with application-specific constraints, such as storage space and/or bandwidth limitations.

In some embodiments, different camera autoencoders may be trained for different applications. For instance, different camera autoencoders may be trained for different image resolutions. Alternatively, or additionally, images of different resolutions may be processed via the same camera autoencoder, for instance via down-sampling.

System Operations

Figure 4:
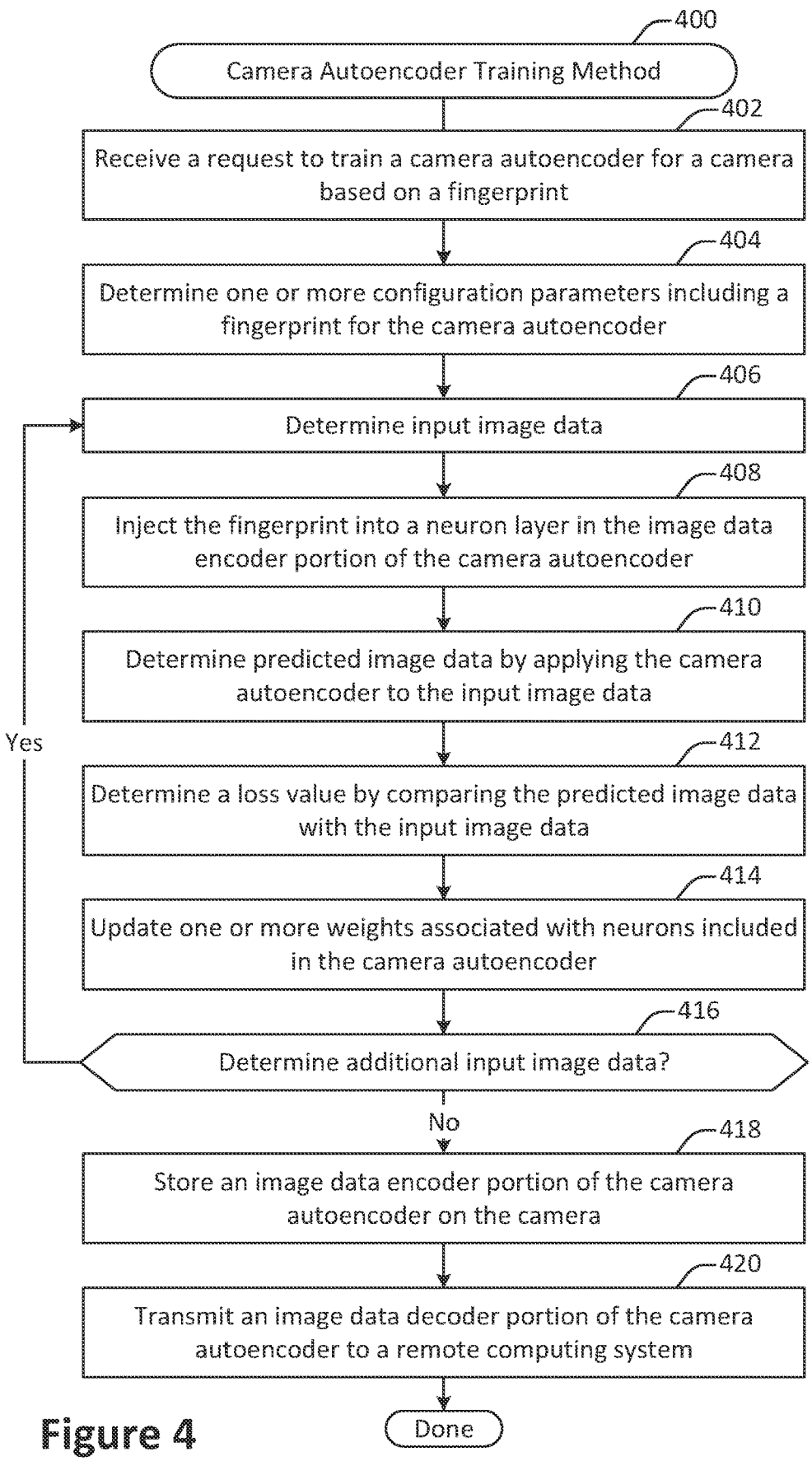
FIG. 4 illustrates a method for training a camera autoencoder, performed in accordance with one or more embodiments.

FIG. 4 illustrates a method 400 for training a camera autoencoder, performed in accordance with one or more embodiments. The method 400 may be performed on any suitable computing device. For instance, the method 400 may be performed on the camera 202 shown in FIG. 2. Alternatively, the method 400 may be performed at least in part on a system in communication with such a camera, such as a local or remote computer.

A request to train a camera autoencoder is received at 402. In some embodiments, the request may be generated based on user input. Alternatively, the request may be generated automatically, for instance during an initialization process associated with configuring the camera. In some instances, the request may be generated periodically, for instance so as to occasionally change the latent space used to encode image data generated at the camera.

One or more configuration parameters including a fingerprint for the camera autoencoder are determined at 404. In some embodiments, the fingerprint may be an FPN-DSNU fingerprint. Additional details regarding a process for determining an FPN-DSNU fingerprint are discussed with respect to the method 500 shown in FIG. 5. Alternatively, the fingerprint may be determined in some other way. For example, the fingerprint may be determined quasi-randomly. For instance, image data may be captured at the camera and then hashed to determine a quasi-random number, which may be used as the fingerprint. As another example, the fingerprint may be determined by another type of hardware-based camera noise aside from an FPN-DSNU fingerprint, such as noise based on camera white levels.

According to various embodiments, the one or more configuration parameters may include one or more hyperparameters for the camera autoencoder. Examples of hyperparameters may include, but are not limited to: the number of layers of neurons in the encoder and/or decoder, the number of neurons in a layer of neurons, the location of the fingerprint in the encoder portion, and/or any other suitable parameters.

In some embodiments, the one or more configuration parameters may include one or more initial weights for the camera autoencoder. For instance, the camera autoencoder may be preconfigured with one or more standard weights. Alternatively, or additionally, one or more randomly generated initial weights may be used.

In some embodiments, one or more configuration parameters may be fixed or limited. For instance, the number of neurons in the camera autoencoder may be limited to a preconfigured number reflective of the storage space available on the camera, computational limitations of the camera, or other such considerations.

In some embodiments, one or more configuration parameters may be determined via hyperparameter tuning. For instance, one or more operations shown in FIG. 4 may be performed repeatedly for different combinations of configuration parameter values. In this way, a set of configuration parameter values may be determined that give rise to a trained camera autoencoder that performs better than would be the case were a fixed set of configuration parameters to be used instead. Depending on the application, hyperparameter tuning may be used to optimize on or balance one or more of storage space, computation time, and camera autoencoder accuracy.

Input image data is determined at 406. In some embodiments, the input image data may be retrieved from nonvolatile storage on the hardware camera. For instance, a rich and diversified set of images taken at different locations and environments may be used to ensure that the autoencoder trained on the image is robustly generalizable to various environments. Alternatively, or additionally, the input image data may include one or more images captured by the camera itself, for instance to improve the performance of the autoencoder in the environment in which the camera is installed.

At 408, the fingerprint is injected into a neuron layer in the image data encoder portion of the camera autoencoder. According to various embodiments, as discussed with respect to FIG. 3, the fingerprint may be injected into a neuron layer by setting weights in the neuron layer based on the fingerprint. For instance, one or more representation space-shifting mathematical operations may be applied to the fingerprint layer using the fingerprint as a parameter of the shifting function.

Predicted image data is determined at 410 by applying the camera autoencoder to the input image data. In some embodiments, the predicted image data may be determined by feeding forward the input image data through the neurons in the camera autoencoder based on the current weights in the neurons, to ultimately produce a set of output values in the output layer of neurons.

A loss value is determined at 412 by comparing the predicted image data with the input image data. In some embodiments, the loss value may be determined based on a loss function. For instance, the loss function may be mean squared error (MSE), KL-divergence, or another type of function. Such a loss function may be configured so as to penalize a divergence between the predicted image data and the input image data.

One or more weights associated with neurons included in the camera autoencoder are updated at 414. In some implementations, the one or more weights may be updated by a process such as backpropagation. In some embodiments, during the backpropagation process, one or more weights in the fingerprint layer may be updated and then rewritten during the next iteration of the training process, at 408. In such a configuration, the weights in the fingerprint layer may also be rewritten at 418 when the encoder portion of the camera autoencoder is stored on the camera. Alternatively, during the backpropagation process, the weights in the fingerprint layer may be omitted from alteration.

A determination is made at 416 as to whether to determine additional input image data. In some embodiments, the determination may be made based at least in part on the loss value determined at 412. For example, the camera autoencoder may continue to be trained using additional input image data until a sufficiently low loss value is realized. As another example, training may continue until a sufficient number of iterations have been reached. As yet another example, training may continue until the successive improvement in the loss value falls below a designated threshold. Depending on the application, various terminating criteria and/or combinations of terminating criteria may be employed.

Upon determining not to determine additional input image data, at 418 an encoder portion of the camera autoencoder is stored on the camera. In some embodiments, the encoder portion may include the weights corresponding to the input neuron layer 306, the one or more internal neuron layers 308 through 310, the fingerprint injection layer 312, and the latent space neuron output layer 314. The encoder portion may be stored on non-volatile storage. For instance, the encoder portion may be stored in a memory location accessible to the neural processing unit 228 shown in FIG. 2.

A decoder portion of the camera autoencoder is transmitted to a remote computing system at 420. In some embodiments, the decoder portion may include the weights corresponding to the latent space neuron input layer 318, the one or more decoder internal neuron layers 320 through 322, and the decoder output neuron layer 322. The decoder portion may be transmitted to the remote computing system 250 via the communication interface 204 for storage on the storage device 238.

Figure 5:
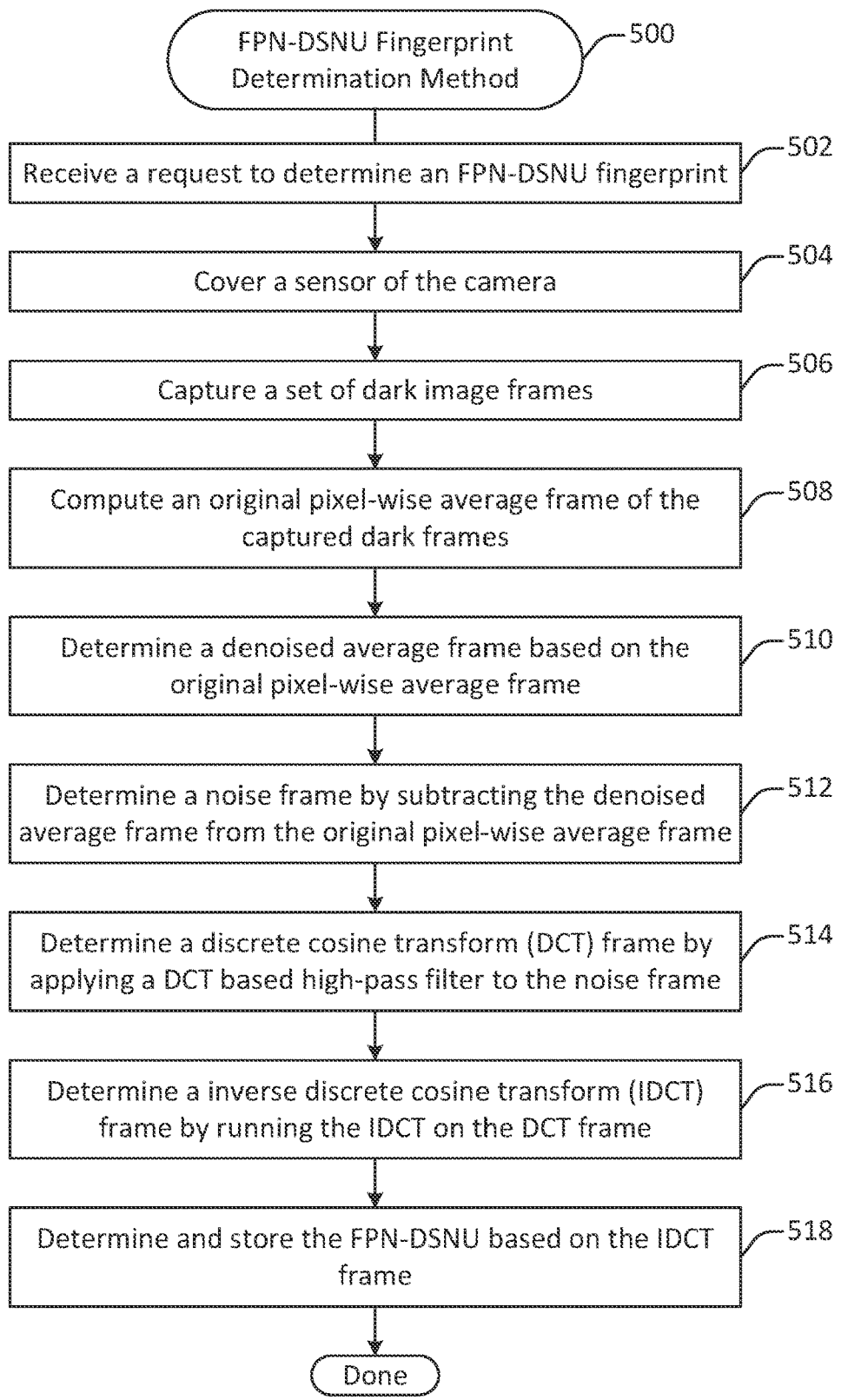
FIG. 5 illustrates a method for determining an FPN-DSNU fingerprint, configured in accordance with one or more embodiments.

FIG. 5 illustrates a method 500 for determining an FPN-DSNU fingerprint, configured in accordance with one or more embodiments. The method 500 may be performed on a camera such as the camera 202 shown in FIG. 2.

In some embodiments, the method 500 may be used to determine a FPN-DSNU fingerprint for the purpose of training a camera autoencoder 300. The resulting FPN-DSNU fingerprint is specific to a particular camera, since even cameras from the same model differ in minute physical variations such as sensor and circuit characteristics that reflect the manufacturing process. Thus, the method 500 may be used to determine a fingerprint that is camera-specific and that may also be used to authenticate the camera.

In some embodiments, the method 500 need not be used to determine a fingerprint. For instance, a fingerprint may be determined by a pseudo-random process based on a hash function as applied to image data. As another example, one or more white-levels rather than dark-levels may be used to determine a camera-specific hardware-generated fingerprint.

A request to determine an FPN-DSNU fingerprint is received at 502. The request may be received as part of a method for training a camera autoencoder. For instance, the request may be received at operation 404 shown in FIG. 4.

A sensor of the camera is covered at 504. In some embodiments, the sensor may be covered by applying a manual shutter to the camera. In particular embodiments, a user may be provided with an instruction to physically cover the camera. Alternatively, the camera may be equipped with a mechanism for covering the sensor upon request.

A set of dark image frames is captured at 506. According to various embodiments, one, two, or any suitable number of dark frame images may be captured by the camera while the sensor is covered. Increasing the number of dark frame images may increase the accuracy of the FPN-DSNU fingerprint at the expense of additional computation time and temporary storage space. When capturing the dark frame images, the image data may not be processed with the image signal processor 214 before being analyzed, to avoid altering the data via pre-processing.

An original pixel-wise average frame may be computed at 508. The original pixel-wise average frame may be computed by determining, for each pixel corresponding to the camera sensor, an average of the values of the corresponding pixels in the dark frame images captured at 506.

A denoised average frame is determined at 510 based on the original pixel-wise average frame. According to various embodiments, any of a variety of denoising techniques may be used. Such techniques may include, but are not limited to: spatial filtering, temporal accumulation, and deep learning reconstruction. For instance, in spatial filtering, parts of the image may be selectively altered by reusing similar neighboring pixels.

A noise frame is determined at 512 by subtracting the denoised average frame from the original pixel-wise average frame. In some embodiments, the noise frame may be subtracted on a pixel-wise basis. That is, for each pixel in the original pixel-wise average frame, the corresponding value in the denoised average frame may be subtracted from the original pixel value.

At 514, a discrete cosine transform (DCT) frame is determined by applying a DCT based high-pass filter to the noise frame. According to various embodiments, the DCT high-pass filter may be used to transform the image into the frequency domain and to remove the low frequency components.

An inverse discrete cosine transform (IDCT) frame is determined at 516 by running the IDCT on the DCT frame. The IDCT transform returns the image to the spatial domain, with the low frequency components removed via the DCT high-pass filter.

The FPN-DSNU fingerprint is determined and stored at 518. In some embodiments, the FPN-DSNU fingerprint may be the IDCT frame. That is, the FPN-DSNU fingerprint may be the high-frequency noise pattern of the same size as the image data.

Figure 6:
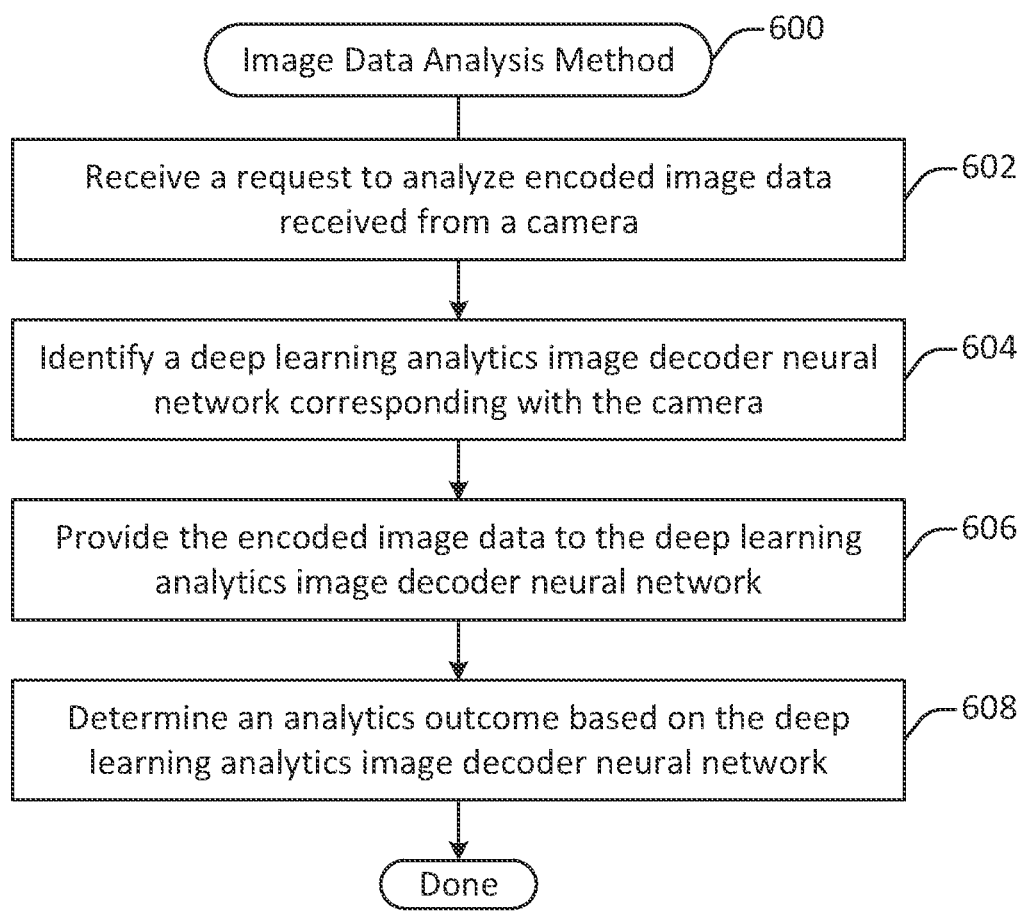
FIG. 6 illustrates a method for analyzing image data, performed in accordance with one or more embodiments.

FIG. 6 illustrates a method 600 for analyzing image data, performed in accordance with one or more embodiments. The method 600 may be performed on a computing system such as the remote computing system 250 shown in FIG. 2. The method 600 may be performed upon receipt of encoded image data from a camera.

A request to analyze encoded image data from a camera is received at 602. In some embodiments, the request may be generated when encoded image data is received from the camera. Alternatively, or additionally, the request may be generated at another time, such as when requested by a systems administrator or client machine. For instance, encoded image data may be stored on the computing system for analysis upon request.

At 604, a deep learning analytics image decoder neural network corresponding with the camera is identified. According to various embodiments, a camera may be associated with a specific analytics network since the analytics network may incorporate the image data decoder that is specific to the camera. Alternatively, the analytics network may be constructed dynamically upon request from an image data decoder specific to the camera and one or more other elements that are not specific to the camera.

The encoded image data is provided to the deep learning analytics decoder neural network at 606, and one or more analytics outcomes are determined at 608 based on the deep learning analytics image decoder neural network.

Figure 7:
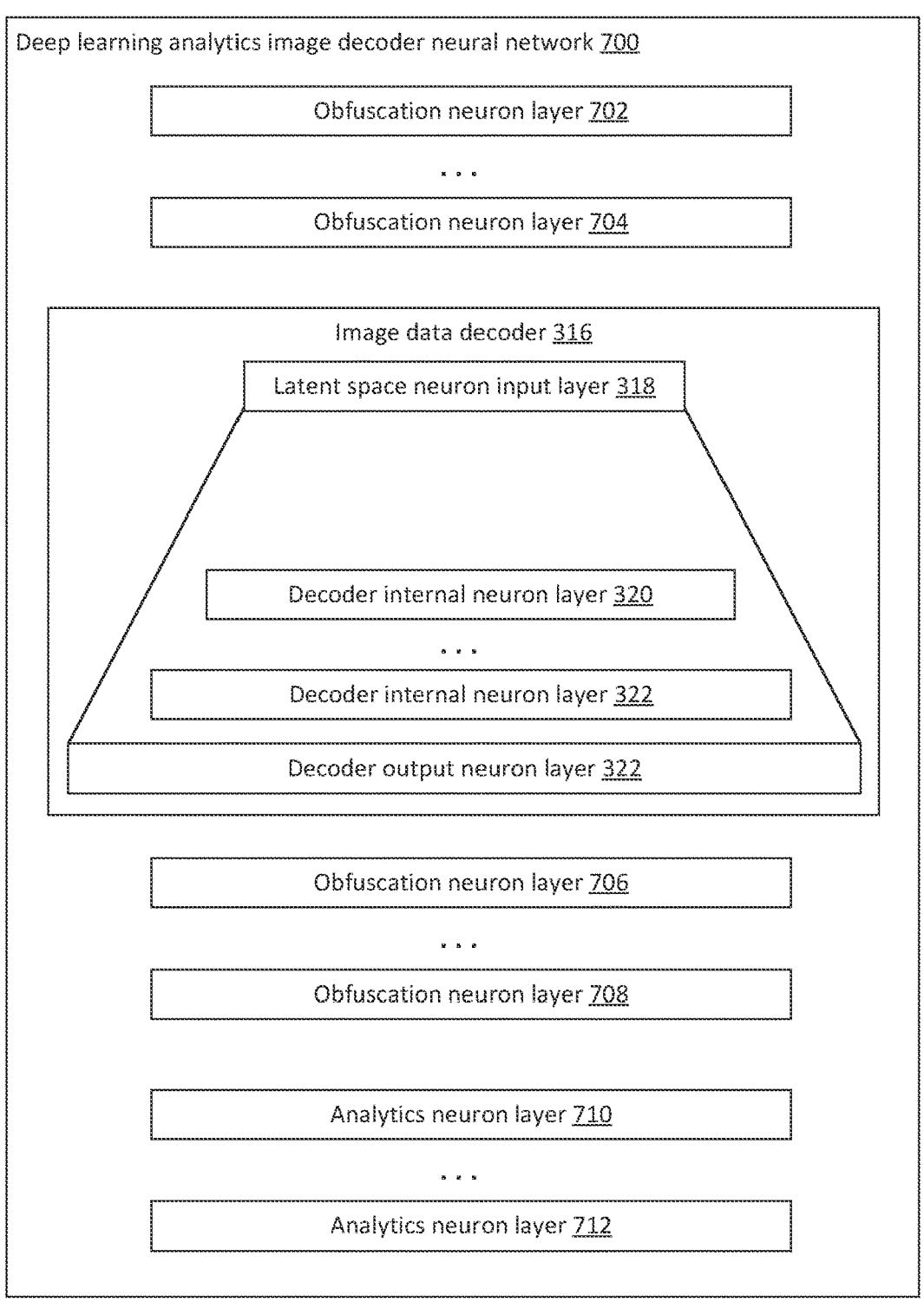
FIG. 7 illustrates a deep learning analytics image decoder neural network, configured in accordance with one or more embodiments.

FIG. 7 illustrates a deep learning analytics image decoder neural network 700, configured in accordance with one or more embodiments. The deep learning analytics image decoder neural network 700 may be implemented in a module at a remote computing system such as the analytics engine 252 shown in FIG. 2.

The deep learning analytics image decoder neural network 700 includes an image data decoder 316. According to various embodiments, the image data decoder 316 may be configured to decode image data encoded via a matching image data encoder at a camera.

The deep learning analytics image decoder neural network 700 also includes one or more analytics neuron layers 710 through 712. According to various embodiments, the one or more analytics neuron layers 710 through 712 may be configured to perform any of various analytics tasks, depending on the application. For instance, the one or more analytics neuron layers 710 through 712 may be configured to perform tasks such as object detection. For instance, the layers may be configured as a "you only look once" (YOLO) detector. Alternatively, or additionally, the neuron layers may be configured to perform other tasks, such as motion detection.

In some embodiments, the deep learning analytics image decoder neural network 700 may include one or more obfuscation layers, such as the obfuscation neuron layers 702, 704, 706, and 708. An obfuscation layer may include a set of neurons that collectively perform an operation on the incoming data that is then undone by a subsequent obfuscation layer. For instance, as a simple example, the obfuscation neuron layer 702 may include a set of neurons that add a set of values to the incoming data values, while the obfuscation neuron layer 704 may include another set of neurons that subtract the same set of value from the incoming data values.

In some embodiments, the obfuscation layers may be used to help reduce the likelihood that an attacker having access to the deep learning analytics image decoder neural network 700 could use the deep learning analytics image decoder neural network 700 to decode image data encoded by an image data encoder. As it is configured, the deep learning analytics image decoder neural network 700 receives as input image data that was encoded using an image data encoder specific to a camera and produces as output analytics information such as an indication that an object was detected in the image data. However, the deep learning analytics image decoder neural network 700 does not produce as output an unencoded image stream. An attacker having access to the deep learning analytics image decoder neural network 700 would see only a set of layers of neurons and, without significant experimentation, not know which layers constituted the image data decoder 316.

In particular embodiments, one or more obfuscation layers may be embedded within the image data decoder 316 itself. Such a configuration may be suitable in certain configurations, such as in the case that one or more layers apply a linear transformation to incoming image data. In such a configuration, the deep learning analytics image decoder neural network 700 may be configured in such a way that a completely unencoded image stream is never produced at all, even inside the deep learning analytics image decoder neural network 700. That is, analytics may be performed on the encoded image stream without ever fully decoding it.

In particular embodiments, the deep learning analytics image decoder neural network 700 may be stored in a customized file format. For instance, the deep learning analytics image decoder neural network 700 may be initially configured in a PyTorch format and then encrypted or otherwise modified so as to be stored in a different format. In such a configuration, even an attacker with access to the deep learning analytics image decoder neural network 700 could not use the deep learning analytics image decoder neural network 700 to decode image data encoded using the corresponding image data encoder.

Conclusion

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of particular camera system configurations. However, the techniques of the present invention apply to a wide variety of cameras. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
   determining a camera autoencoder trained based on training image data collected from a hardware camera and a fingerprint specific to the hardware camera, the camera autoencoder including an image data encoder stored on a storage device at the hardware camera and an image data decoder stored on a remote computing system, wherein determining the camera autoencoder comprises training the camera autoencoder based on the training image data, storing the image data encoder on the storage device, and transmitting the image data decoder to the remote computing system;
   determining input image data from a camera sensor included in the hardware camera;
   determining encoded image data by encoding the input image data at the hardware camera with the image data encoder, wherein the image data encoder includes a plurality of encoder internal neuron layers and encodes the input image data into a latent space neuron layer; and
   transmitting the encoded image data to the remote computing system, the remote computing system determining decoded image data by decoding the encoded image data via the image data decoder, wherein the image data decoder includes a plurality of decoder neuron layers and decodes the encoded image data from the latent space neuron layer into a decoder output neuron layer.

2. The method recited in claim 1, wherein the fingerprint is a fixed pattern noise (FPN) dark signal non-uniformity (DSNU) pattern.

3. The method recited in claim 2, the method further comprising determining the FPN DSNU pattern, wherein determining the FPN DSNU pattern comprises:
   capturing one or more dark frame images with the camera sensor while the camera sensor is covered.

4. The method recited in claim 3, wherein determining the FPN DSNU pattern further comprises:
   determining a pixel-wise average frame based on the one or more dark image frames; and determining a denoised average frame based on the pixel-wise average frame.

5. The method recited in claim 4, wherein determining the FPN DSNU pattern further comprises:
determining an updated frame by subtracting the denoised average frame from the pixel-wise average frame; and
applying a discrete cosine transform high-pass filter to the updated frame.

6. The method recited in claim 1, wherein the remote computing system includes a deep learning analytics image decoder neural network that includes the image data decoder and one or more analytics neuron layers configured to perform one or more analytics tasks.

7. The method recited in claim 6, wherein the deep learning analytics image decoder neural network includes a plurality of obfuscation layers collectively configured to implement a transformation and an inverse of the transformation.

8. The method recited in claim 6, wherein the deep learning analytics image decoder neural network is configured to perform the one or more analytics tasks without producing a visualizable image stream at the remote computing device.

9. The method recited in claim 1, wherein the image data encoder is entangled in an image signal processing deep learning network implemented at the hardware camera and configured to perform image signal processing operations on the input image data.

10. The method recited in claim 9, wherein the encoded image data is determined and the image signal processing operations are performed without producing a visualizable image stream at the hardware camera.

11. A hardware camera comprising:
a camera sensor configured to determine input image data;
an image signal processor configured to perform one or more image signal processing operations on the input image data;
a neural processing unit configured to determining encoded image data by encoding the input image data with an image data encoder portion of a camera autoencoder, the camera autoencoder being trained based on training image data collected from the camera sensor and a fingerprint specific to the hardware camera, the camera autoencoder including an image data decoder stored on a remote computing system, the image data encoder including a plurality of encoder internal neuron layers and encoding the input image data into a latent space neuron layer; and
a camera communication interface configured to transmit the encoded image data to the remote computing system, the remote computing system determining decoded image data by decoding the encoded image data via the image data decoder, the image data decoder including a plurality of decoder neuron layers and decoding the encoded image data from the latent space neuron layer into a decoder output neuron layer.

12. The hardware camera recited in claim 11, wherein the fingerprint is a fixed pattern noise (FPN) dark signal non-uniformity (DSNU) pattern, wherein the hardware camera is further configured to determine the FPN DSNU pattern at least in part by capturing one or more dark frame images with the camera sensor while the camera sensor is covered, and wherein determining the FPN DSNU pattern comprises:
determining a pixel-wise average frame based on the one or more dark image frames;
determining a denoised average frame based on the pixel-wise average frame;
determining an updated frame by subtracting the denoised average frame from the pixel-wise average frame; and
applying a discrete cosine transform high-pass filter to the updated frame.

13. The hardware camera recited in claim 11, wherein the remote computing system includes a deep learning analytics image decoder neural network that includes the image data decoder entangled with one or more analytics neuron layers configured to perform one or more analytics tasks.

14. The hardware camera recited in claim 13, wherein the deep learning analytics image decoder neural network includes a plurality of obfuscation layers collectively configured to implement a transformation and an inverse of the transformation.

15. The hardware camera recited in claim 14, wherein the deep learning analytics image decoder neural network is configured to perform the one or more analytics tasks without producing a visualizable image stream at the remote computing system.

16. The hardware camera recited in claim 12, wherein the image data encoder is entangled in an image signal processing deep learning network implemented at the hardware camera and configured to perform image signal processing operations on the input image data.

17. One or more non-transitory computer readable media having instructions stored thereon for performing a method, the method comprising:
determining a camera autoencoder trained based on training image data collected from a hardware camera and a fingerprint specific to the hardware camera, the camera autoencoder including an image data encoder stored on a storage device at the hardware camera and an image data decoder stored on a remote computing system, wherein determining the camera autoencoder comprises training the camera autoencoder based on the training image data, storing the image data encoder on the storage device, and transmitting the image data decoder to the remote computing system;
determining input image data from a camera sensor included in the hardware camera;
determining encoded image data by encoding the input image data at the hardware camera with the image data encoder, wherein the image data encoder includes a plurality of encoder internal neuron layers and encodes the input image data into a latent space neuron layer; and
transmitting the encoded image data to the remote computing system, the remote computing system determining decoded image data by decoding the encoded image data via the image data decoder, wherein the image data decoder includes a plurality of decoder neuron layers and decodes the encoded image data from the latent space neuron layer into a decoder output neuron layer.

18. The one or more non-transitory computer readable media recited in claim 17, wherein the fingerprint is a fixed pattern noise (FPN) dark signal non-uniformity (DSNU) pattern, wherein the hardware camera is further configured to determine the FPN DSNU pattern at least in part by capturing one or more dark frame images with the camera sensor while the camera sensor is covered, determining a pixel-wise average frame based on the one or more dark image frames, determining a denoised average frame based on the pixel-wise average frame, determining an updated frame by subtracting the denoised average frame from the pixel-wise average frame, and applying a discrete cosine transform high-pass filter to the updated frame.

19. The one or more non-transitory computer readable media recited in claim 17, wherein the remote computing system includes a deep learning analytics image decoder neural network that includes the image data decoder entangled with one or more analytics neuron layers configured to perform one or more analytics tasks, and wherein the deep learning analytics image decoder neural network is configured to perform the one or more analytics tasks without producing a visualizable image stream at the remote computing system.

20. The one or more non-transitory computer readable media recited in claim 18, wherein the image data encoder is entangled in an image signal processing deep learning network implemented at the hardware camera and configured to perform image signal processing operations on the input image data.

\* \* \* \* \*